Nov. 21, 1939. R. LAPSLEY Re. 21,273

TRANSMISSION

Original Filed Jan. 31, 1931 2 Sheets-Sheet 1

Inventor:
Robert Lapsley
By Brown Jackson Boettcher & Dienner Attys

TRANSMISSION

Original Filed Jan. 31, 1931 2 Sheets-Sheet 2

Inventor:
Robert Lapsley.
By Brown Jackson Boettcher & Dienner
Attys.

Reissued Nov. 21, 1939

Re. 21,273

UNITED STATES PATENT OFFICE 21,273

TRANSMISSION

Robert Lapsley, Berrien Springs, Mich., assignor to Clark Equipment Company, Buchanan, Mich., a corporation of Michigan Original No. 1,992,898, dated February 26, 1935, Serial No. 512,596, January 31, 1931. Application for reissue October 16, 1936, Serial No. 105,935

20 Claims. (Cl. 74—333)

The present invention relates generally to automobile transmissions, and more particularly to a new and improved mounting for one of the gears of the transmission and to a new and improved countershaft or secondary shaft construction.

The present construction which illustrates one embodiment of my invention is particularly adapted for transmissions employing helical gears, since the mounting of the gears and the countershaft is particularly arranged to take care of the axial thrusts arising from the use of helical gears.

Other objects and advantages of the present invention will be apparent to those skilled in the art after a consideration of the following detailed description of the preferred structural embodiment, taken in conunction with the accompanying drawings, in which.

Figure 1:
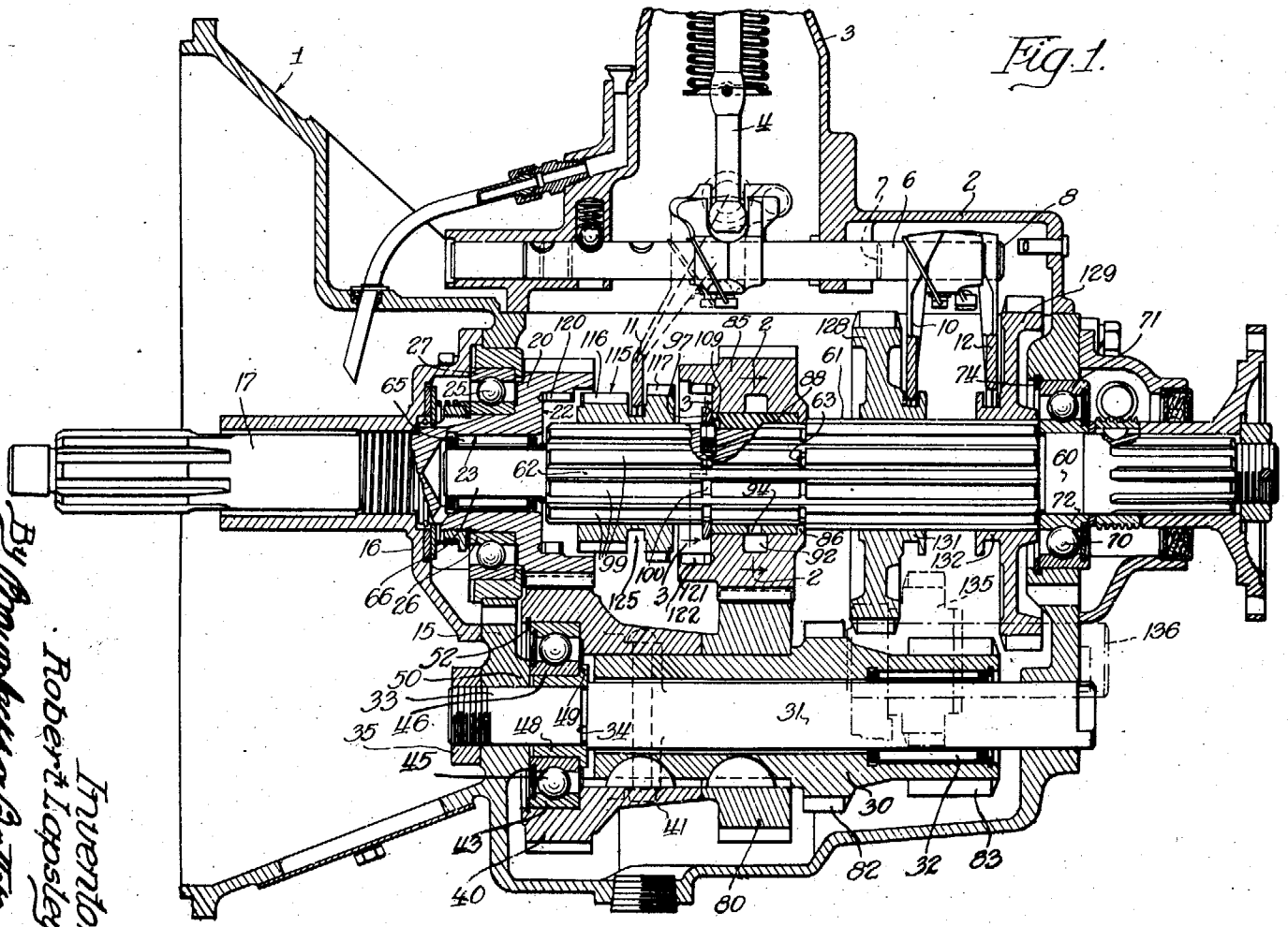
Figure 1 is a vertical cross-sectional view through a transmission embodying the principles of the present invention.

In the drawings, the reference numeral 1 indicates in its entirety the housing of the transmission. The housing 1 carries a cover plate 2 having the pedestal 3 in which is mounted the usual gear shift lever, the lower end of which is indicated by the reference numeral 4, and the associated shift rods 6, 7 and 8 carrying the shift forks 10, 11 and 12 in the usual and well known manner. The forward web 15 of the transmission housing 1 carries a bearing cap 16 in which is journaled the driving shaft 17 which is adapted to be connected at its forward end to the clutch of an automobile motor (not shown). The rear end of the driving shaft 17 carries or has formed integrally therewith a driving gear 20 which is provided with a pair of axial concentric bores 22 and 23 the purpose of which will be described later.

The driving gear 20 is journaled in the transmission housing 1 by means of ball bearings 25 having an inner race 26 secured to the driving gear 20 and an outer race 27 mounted in the forward web 15 of the transmission housing.

A tubular secondary or countershaft 30 is journaled in the lower part of the transmission housing. For this purpose the housing carries a fixed shaft 31 carrying a roller bearing structure 32 upon which the rear end of the tubular countershaft 30 is supported. The forward end 33 of the fixed shaft 31 is reduced and threaded, there being a shoulder 34 between the forward and the rear portions of the fixed shaft. A nut 35 is adapted to be threaded onto the reduced end 33 of the fixed shaft and to effectively secure the shaft in position in the transmission housing. The forward end of the tubular countershaft 30 carries a helical driven gear 40 which is arranged to be in constant mesh with and driven by the driving gear 20 which also is a helical gear and is formed with an extended hub portion 41 having a bore receiving the forward end of the countershaft 30 to which the hub 41 of the driven gear 40 is fixedly secured as by a key or other means.

The driven gear 40 is formed with an axial recess which receives the outer race 43 of the bearing means supporting the driven gear 40 and the forward end of the tubular countershaft. This bearing means comprises a plurality of anti-friction elements in the form of balls 45 operating between the outer race 43 and an inner race 46. The latter is mounted on a flanged washer 46, one end of which abuts against the shoulder 34 on the fixed shaft while the flange 49 thereof abuts against the inner race 46 so that when the nut 35 is tightened the bearing means for the driven shaft 40 is effectively clamped and secured in place in the transmission housing 1 against the forward web 15. In order to better position these parts the web 15 is provided with an annular boss 50 to receive the inner race 46 thereagainst. The outer race 43 is held in place in the driven gear 40 by a spring 52 snapped into a suitably formed groove in the driven gear 40. The driven gear and the bearing means just described are so arranged that any forward thrust transmitted to the driven gear is resisted by the balls 45, and the outer and inner races 43 and 46.

A driven shaft 60 is journaled for rotation in the transmission housing 1. This shaft comprises splined portions 61 and 62 of different diameters, there being a circumferential and forwardly facing shoulder 63 between these two portions. The forwardmost end 66 of the driven shaft 60 is reduced and is suitably supported by bearings 65 in the axial bore 23 formed in the driving gear 20. As shown in Figure 1 this bearing means comprises a plurality of rollers. The rear end of the driven shaft 60 is supported in the housing 1 by bearing means 70 arranged to take both axial and radial thrust, the same as the bearing means 45 for the driven gear and the countershaft. The bearing means 70 comprises a plurality of balls mounted between a fixed outer race 71 and an inner race 72 secured to the driven shaft 60 in the usual manner. A spring ring 74 holds the outer race 71 in proper position in the rear wall of the transmission housing 1.

Figure 2:
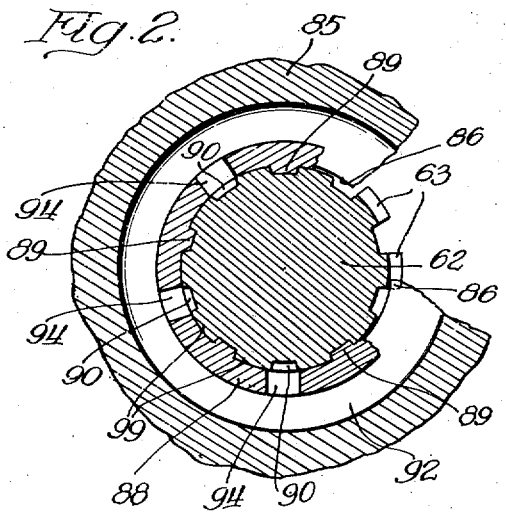
Figure 2 is an enlarged cross-section taken substantially along the line 2—2 of Figure 1.

The tubular countershaft or secondary shaft 30 carries a helical gear 80 suitably keyed thereto and a pair of smaller gears 82 and 83, the latter being preferably formed integrally with the countershaft 30 but may be separate parts keyed or otherwise secured to the countershaft if desired. The helical gear 80 is in constant mesh with a corresponding helical gear 85 journaled on the driven shaft 60. This gear is provided with an inwardly extending radial flange 86 received against the abutment shoulder 63 whereby the gear 85 is prevented from moving rearwardly. The gear 85 is mounted on a bushing 88 having a smooth exterior surface to form a bearing support for the gear 85 and a plurality of teeth 89 adapted to be received between the splines on the portion 62 of the driven shaft 60. As best shown in Figure 2 one or more teeth 89 are omitted so that there are spaces or openings 90 between certain splines so that lubricant may find its way between the bushing 88 and the driven shaft 60. The gear member 85 is provided with an interior circumferential groove 92 and the bushing 88 is provided with one or more openings 94 so that the lubricant may flow in through the spaces 90 and the openings 94 into the groove 92.

The rear end of the bushing or bearing member 88 contacts with the flange 86 and holds the same against the shoulder 63 on the driven shaft 60. The bushing 88 is itself held in position by a toothed ring or washer 97, best shown in Figures 3 and 4. As shown in these figures, the washer 97 is provided with a plurality of teeth 98 which are spaced to correspond to the splines 99 on the smaller splined portion of the driven shaft 60. The splines 99 are interrupted adjacent the forward edge or end of the bushing 88 so as to form in effect a circumferential groove 100 on the driven shaft.

Figure 3:
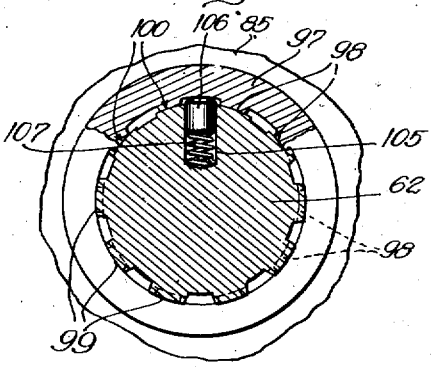
Figure 3 is an enlarged cross-section taken substantially along the line 3—3 of Figure 1.
Figure 4:
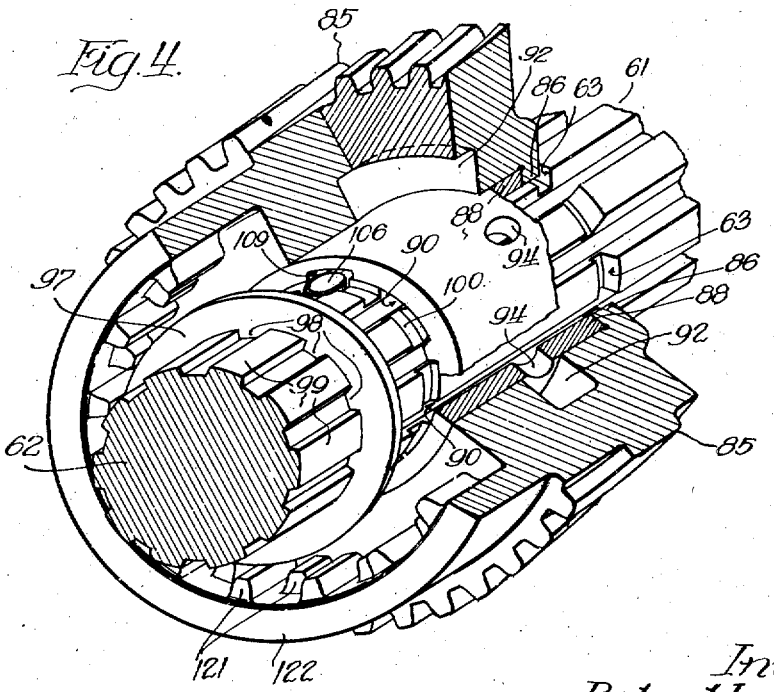
Figure 4 is a perspective illustrating the method of mounting of these parts and the means holding one of the helical gears in place on the driven shaft.

When assembling the gear 85 and the bushing 88 on the driven shaft 60 the gear 85 is first slipped over the forward end of the driven shaft and brought in position thereon with its flange 86 in abutting engagement with the shoulder 63. Next the bushing 88 is slipped onto the smaller splined portion 62 of the driven shaft 60 with the teeth thereof positioned as indicated in Figure 2. Lastly the toothed washer 97 is passed over the forward end of the shaft 60, as indicated in Figure 4, and then when it reaches the groove 100 the washer is given a slight turn to bring the teeth 98 thereof in the groove 100 and behind the splines 99, as best shown in Figure 3. The driven shaft 60 is provided with a radial bore 105 in which is mounted a pin or plunger 106 which is normally urged outwardly by a spring 107 seated in the bore 105. When the washer or ring 97 is turned to the position shown in Figure 3 the spring pressed plunger or pin 106 moves outwardly and occupies a position between adjacent teeth 98 on the ring or washer 97 so as to effectively hold or lock the washer and the associated bushing 88 in place. If necessary, the bushing 88 may be provided with a small recess or relief 109 to accommodate the spring pressed plunger 106. The bushing 88 may be removed to permit the removal of the gear 85 by depressing the plunger 106 with a suitable tool and rotating the toothed washer 97 back to the position shown in Figure 4.

A sliding clutch dog or hub 115 is mounted on the splined portion 62 of the driven shaft 60 and is provided with two sets of teeth 116 and 117 which are adapted to engage, respectively, with teeth 120 formed on the interior of the axial bore or recess 22 of the driving gear 20 and with teeth 121 formed interiorly of the forward hub 122 on the floating gear 85. A shifter groove 125 on the driving hub 115 is embraced by the arms of the shift fork 11.

A pair of gears 128 and 129 are mounted on the larger splined portion 61 of the driving gear 60 and each have grooved hubs 131 and 132 engaged respectively by the shift forks 10 and 12. The gear 128 is adapted to be shifted forwardly to engage the gear 82 on the countershaft 30 and to be moved rearwardly to engage the idler or reverse gear 135 journaled on an idler shaft 136 supported in the transmission housing 1. The gear 129 is adapted to be shifted forwardly to engage with the gear 83 on the countershaft 30. The gear 83 is provided with relatively long teeth so as to drive the idler or reverse gear 135.

The operation of the transmission constructed according to the present invention is substantially as follows. Low speed or first speed is attained by actuating the shift rod 8 to move the gear 129 into engagement with the gear 83 on the countershaft 30. The latter shaft is being constantly driven from the driving gear 20 on the driving shaft 17 and hence the drive is transmitted through the driving gear 20 and the driven gear 40 to the countershaft 30 and through gear 83 to the gear 129 splined on and driving the driven shaft 60. For second speed the shift rod 6 is actuated to move the gear 128 forwardly into engagement with the gear 82, and for third speed the shift rod 7 is actuated to move the sliding dog or clutch hub 115 rearwardly so that the teeth 117 engage the teeth 121 on the gear 85. With this arrangement the drive is transmitted from the driving shaft 17 through the driving gear 20 and the driven gear 40 to the countershaft 30, which drives the helical gear 80 and the helical gear 85, these gears being constantly in mesh. The gear 85 is freely rotatable on the driven shaft 60 but when the clutch dog 115 is moved rearwardly the gear 85 is connected with the driven shaft 60 and hence in third speed the drive is through the helical gears 80 and 85.

Since the gears 20, 40, 80 and 85 are helical gears there are components of axial thrust which must be taken care of. Remembering that the gear 85 has its flange 86 held against the abutment shoulder 63 on the driven shaft 60 by the bushing 88 and washer 97, it will be observed that any forward thrust of the gear will be transmitted by the bushing 88 and the washer 97 to the driven shaft 60 and its bearing 70—72 in the rear of the housing and that rearward axial thrust of the gear 85 will be transmitted directly to the driven shaft and to its bearing 70—72 in the transmission housing without going through the bushing 88 or bearing means by which the gear is rotatably held on the driven shaft 60. The corresponding thrust of the gear 80 which is keyed onto the tubular countershaft 30 is transmitted by the countershaft directly forward to its bearing means 45 at the forward end of the transmission. The thrust of gear 20 is taken care of by its bearing 25—27. In this way the driving strains in the transmission are effectively resisted by parts which are best constructed to withstand them.

For fourth speed or direct drive the sliding clutch hub 115 is shifted forwardly on the splines 99 until the teeth 116 engage the teeth 120 on the driving gear 20. When so engaged the driven shaft 60 is connected directly with the driving shaft 17. For reverse, the gear 128 is shifted rearwardly until the teeth thereof engage the outer or reverse pinions 135 in the usual manner.

Due to the spaces 90 around the splined portion 62 and the one or more openings 94 the bearing of the floating gear 85 on the driven shaft 60 is adequately lubricated.

While I have shown and described in detail the preferred structural embodiment of the present invention it is to be understood that the principles of my invention can be employed in means which is widely different from that shown in the drawings.

What I claim, therefore, and desire to secure by Letters Patent is:

1. In a transmission comprising a housing, and a driven shaft journaled therein, said driven shaft having a splined end and abutment means thereon, a gear mounted on the splined portion and having a flange received against said abutment means, a bushing on the said splined portion and engaging the flange of said gear, said bushing providing a journal support for the gear, and means securing the bushing in place on the driven shaft.

2. In a transmission comprising a driving shaft, a driven shaft, a countershaft, and gear means connecting the driving shaft and a countershaft, the driven shaft having a splined reduced portion and an abutment shoulder between the splined portion and the portion of larger diameter, a bushing carried in said splined portion adjacent the shoulder, gear means connecting the driven shaft and the countershaft and including a gear journaled on said bushing, and locking means for holding said gear in position on the bushing and against said shoulder.

3. In a transmission comprising a driving shaft, a driven shaft, a countershaft, and gear means connecting the driving shaft and the countershaft, the driven shaft having a splined reduced portion and an abutment shoulder between the splined portion and the portion of larger diameter, a bushing carried by said splined portion adjacent the shoulder, gear means connecting the driven shaft and the countershaft and including a gear having an internal groove journaled on said bushing, and ports formed in the bushing to provide communication between the space between the splines on said reduced driven shaft portion and the internal groove in said gear for lubricating said gear and bushing.

4. In a transmission including a housing, and a driven shaft journaled therein and having one portion of larger diameter than the other, there being a shoulder therebetween, a gear adapted to be mounted on said shaft and having an inwardly extending radial flange, bearing means adapted to be slipped onto the driven shaft and receive the gear and to contact with the flange to hold it against said shoulder, and means to hold the bearing means in position on the shaft whereby the gear is journaled for free rotation on the shaft but prevented from moving axially thereof.

5. In a transmission including a housing, and a driven shaft journaled therein and having one portion of larger diameter than the other, there being a shoulder therebetween and the portion of smaller diameter being splined, a gear adapted to be mounted on said shaft and having an inwardly extending radial flange, bearing means adapted to be slipped onto the splined portion of the driven shaft and receive the gear and to contact with the flange to hold it against said shoulder, the bearing means comprising a bushing having interior splines cooperating with the splined portion of the driven shaft, the splines of the bushing being interrupted and the bushing being apertured to provide for lubricating the gear and bushing, means to hold the bushing in position on said shaft, comprising a toothed washer adapted to be mounted on the splined portion of the driven shaft against the bushing, the splines of the shaft being interrupted to permit the washer being turned to bring the teeth thereof in contact with the ends of said splines, and means to retain the washer in position with the teeth behind the splines.

6. In a transmission comprising a housing, and a driven shaft journaled therein, there being abutment means on the driven shaft, a gear mounted on the driven shaft, and means acting as a journal support for the gear for holding the latter against said abutment means whereby axial thrusts of the gear are transmitted to the driven shaft.

7. In a transmission comprising a housing, and a driven shaft journaled therein, said driven shaft having portions of unequal diameter, the smaller portion being splined, abutment means formed between said portions of unequal diameter, a gear mounted on the smaller portion and engaging said abutment means, and means mounted on the smaller splined portion of the driven shaft for rotatably supporting the gear in position against said abutment means.

8. In a transmission, a shaft having a radially disposed abutment means, a gear member mounted for rotation on said shaft and reacting at one end against said abutment means, whereby the gear member is restrained against axial movement in one direction, a groove formed in said shaft at the other end of said gear member and spaced from said abutment means, a ring carried in said groove against said other end of the gear member and reacting against said shaft for holding said gear member in position, a clutch section having a set of radially extending clutch teeth carried at the other end of said gear member and overhanging and spaced radially outwardly of said ring, and a shiftable clutch member in driving engagement with said shaft and movable toward said ring, said clutch member having radially disposed teeth adapted to engage said overhanging teeth on said gear-carried clutch section and said abutment means taking the reaction when said clutch member comes into engagement with said clutch section.

9. In a transmission, a driven shaft having a splined section, means on the driven shaft providing a radially extending shoulder, a driven gear mounted for rotation on said driven shaft and held at one end against axial displacement in one direction by said shoulder, an annular groove formed adjacent the other end of said driven gear in the splined portion of the driven shaft, a ring disposed in the groove at said other end of the driven gear, means cooperating with said ring so as to hold said driven gear against axial displacement in the other direction, a clutch hub section on said driven gear extending axially from said other end thereof and embracing said groove and ring, radially inwardly directed clutch teeth carried on said hub section, and a clutch member slidable on said splined shaft section and having a set of exterior clutch teeth adapted to be moved toward said ring and groove to engage the clutch teeth on said clutch hub section, said shoulder taking the reaction of said gear when said clutch member moves into engagement therewith.

10. In a transmission, a shaft having a radially disposed abutment means, a gear member mounted for rotation on said shaft with one end disposed up against and in contact with said abutment means, a groove formed in said shaft at the other end of said gear member and spaced from said abutment means, a ring carried in said groove against said other end of the gear member, and means reacting against said shaft for holding said ring in position and accessible for disassembly when in ring-holding relation.

11. In a transmission comprising a housing and a splined shaft journaled therein, said shaft having means serving as abutment means formed integrally on the shaft, a gear mounted on said shaft and having one end received against said abutment means, a groove formed in said shaft adjacent the other end of said gear opposite said abutment means and exposing end portions of said splines, a ring disposed in said groove against said end portions of the splines and serving to hold said gear in contact with said abutment means, and means disposed between certain of said splines and engaging said ring for holding the gear in position and accessible at one side of the ring when engaging the latter.

12. In a transmission comprising a housing and a splined shaft journaled therein, said shaft having a reduced portion so that the ends of the splines adjacent one end of the reduced section serve as abutment means formed integrally on the shaft, a gear mounted on said shaft and having one end received against said abutment means, a ring member at the end of said gear opposite said abutment means for holding said gear up against the abutment means, and means separate from the ring and normally held against rotating movement with respect to said shaft for holding the ring in position, said means being disposed axially of the shaft outwardly of said ring so as to be accessible to provide for releasing said ring and gear when desired.

13. In a transmission including a housing and a driven shaft journaled therein and having one portion of larger diameter than the other, there being a shoulder therebetween, a gear adapted to be mounted on said shaft and having an inwardly extending radial flange adapted to be disposed with its outer face against said shoulder, bearing means adapted to be slipped onto the driven shaft substantially against the inner face of said flange and to receive and support the gear, and means to hold the bearing means in position on the shaft and prevent said gear from moving axially away from said shoulder thereof.

14. In a transmission comprising a housing and a shaft journaled therein, said shaft having means serving as abutment means formed integrally on the shaft, a gear mounted on said shaft and having an inwardly directed flange at one end with its outer face received against said abutment means, bearing means on said shaft at the inner side of the flange opposite said abutment means and providing a journal support for the gear on said shaft, and means for holding said gear and bearing means in proper position on said shaft.

15. In a transmission comprising a housing and a splined shaft journaled therein, said shaft having means serving as abutment means formed integrally on the shaft, a gear mounted on said shaft and having an inwardly directed flange at one end received against said abutment means, bearing means on said shaft at the side of the flange opposite said abutment means and providing a journal support for the gear on said shaft, there being a groove in said shaft adjacent the end of the gear opposite said abutment means, a ring seated in said groove for holding said gear and bearing means in proper position on said shaft, and means for retaining said ring in interlocked relation with respect to the splines of said shaft and holding said ring in said groove.

16. In a transmission, a shaft having a radially disposed abutment means, a gear member mounted for rotation on said shaft and reacting at one end against said abutment means, whereby the gear member is restrained against axial movement in one direction, a groove formed in said shaft at the other end of said gear member and spaced from said abutment means, journal means supporting said gear member on said shaft, a ring carried in said groove and reacting against said shaft for holding said journal means in position and said gear member up against said abutment means, a clutch section carried at said other end of said gear member and including a set of radially extending clutch teeth overhanging and spaced radially outwardly of said ring, and a shiftable clutch member in driving engagement with said shaft and movable toward said ring, said clutch member having radially disposed teeth adapted to engage said overhanging teeth of said clutch section, said abutment means taking the reaction when said clutch member comes into engagement with said clutch section and said ring taking the reaction when said clutch member is disengaged from said gear-carried clutch section.

17. In a transmission, a shaft having a radially disposed abutment means, a gear member mounted for rotation on said shaft and reacting at one end against said abutment means, whereby the gear member is restrained against axial movement in one direction, a groove formed in said shaft at the other end of said gear member and spaced from said abutment means, means acting as a journal support for said gear member for holding the latter against said abutment means for restraining axial movement of said gear member in the other direction, a ring carried in said groove and reacting against said shaft for holding said journal support means in position, a clutch section carried at said other end of said gear member and including a set of radially extending clutch teeth overhanging and spaced radially outwardly of said ring and the adjacent end of said journal support means, and a shiftable clutch member in driving engagement with said shaft and movable toward said ring, said clutch member having radially disposed teeth adapted to engage said overhanging teeth of said clutch section, said abutment means taking the reaction when said clutch member comes into engagement with said clutch section and said ring acting through said journal support means for taking the reaction when said clutch member is disengaged from said gear-carried clutch section.

18. In a transmission, a shaft having a radially disposed abutment means and a splined portion in which a groove is formed in spaced relation with respect to said abutment means, a gear mounted on the splined portion of said shaft and having an end received against said abutment means and an axially directed toothed clutch section at the other end, a ring carried in said groove and reacting against said shaft for holding said gear in place against said abutment means, said clutch section extending axially of and overhanging said ring, and a splined shiftable clutch member carried for axial movement on said splined portion and movable toward said gear for clutching the latter to said shaft, said abutment means taking the reaction when said clutch member comes into engagement with said clutch section and said ring acting to take the reaction when said clutch member is disengaged from said clutch section.

19. In a transmission, a shaft having a radially disposed abutment means and a splined portion in which a groove is formed in spaced relation with respect to said abutment means, a gear mounted on the splined portion of said shaft and having a flange at one end received against said abutment means and an axially directed toothed clutch section at the other end, a bushing on said splined portion and engaging the flange of said gear, a ring carried in said groove and reacting against said shaft for holding said bushing in place, said bushing serving as a journal support for the gear and holding the flange of the latter against said abutment means, said clutch section extending axially of and overhanging said ring and the adjacent end of said bushing, and a shiftable clutch member carried for axial movement on said splined portion and movable toward said gear for clutching the latter to said shaft, said abutment means taking the reaction when said clutch member comes into engagement with said clutch section and said ring acting through said bushing to take the reaction when said clutch member is disengaged from said clutch section.

20. In a transmission, a driven shaft having a splined section, means on the driven shaft providing a radially extending shoulder, a driven gear mounted for rotation on said driven shaft and held at one end against axial displacement in one direction by said shoulder, an annular groove formed in the splined portion of the driven shaft and substantially in the plane of the other end of said driven gear, means including a ring disposed in the groove at said other end of the driven gear and reacting against said shaft for holding the gear against axial displacement in the other direction, a clutch section on said driven gear extending axially from said other end thereof and embracing said groove and ring, radially inwardly directed clutch teeth carried on said hub section, a clutch member slidable on said splined shaft section and having a set of exterior clutch teeth, and means to shift said slidable clutch member in one direction toward said ring to engage the clutch teeth on said clutch section and in the other direction out of engagement therewith, said shoulder on the driven shaft taking the reaction when said clutch member is engaged with said clutch section and said ring taking the reaction when said shiftable clutch member is disengaged from said clutch section.

ROBERT LAPSLEY.